US012016106B2

(12) United States Patent
Shin et al.

(10) Patent No.: US 12,016,106 B2
(45) Date of Patent: Jun. 18, 2024

(54) COOKING APPLIANCE

(71) Applicants: LG Electronics Inc., Seoul (KR); Mokpo National University Industry—Academic Cooperation Foundation, Jeollanam-do (KR)

(72) Inventors: Jaeyoung Shin, Seoul (KR); Sunghun Sim, Seoul (KR); Junghyeong Ha, Seoul (KR); Yongsoo Lee, Seoul (KR); Taeho Kim, Seoul (KR); Taehee Kim, Seoul (KR); Seokkyun Son, Jeollanam-do (KR); Dohun Kim, Gyeonggi-do (KR)

(73) Assignees: LG Electronics Inc., Seoul (KR); Mokpo National University Industry—Academic Cooperation Foundation, Jeollanam-do (KR)

( * ) Notice: Subject to any disclaimer, the term of this patent is extended or adjusted under 35 U.S.C. 154(b) by 393 days.

(21) Appl. No.: 17/141,816

(22) Filed: Jan. 5, 2021

(65) Prior Publication Data

US 2022/0095423 A1 Mar. 24, 2022

(30) Foreign Application Priority Data

Sep. 22, 2020 (KR) ........................ 10-2020-0122564

(51) Int. Cl.
*H05B 6/64* (2006.01)
*H05B 6/80* (2006.01)

(52) U.S. Cl.
CPC ......... *H05B 6/6426* (2013.01); *H05B 6/6488* (2013.01); *H05B 6/80* (2013.01)

(58) Field of Classification Search
CPC ...... H05B 6/6426; H05B 6/80; H05B 6/6488; H05B 6/76; H05B 6/6408; H05B 6/647; H05B 11/00; A47J 36/027; A47J 36/04
See application file for complete search history.

(56) References Cited

U.S. PATENT DOCUMENTS 4,745,246 A 5/1988 Hori et al.
5,177,333 A 1/1993 Ogasawara
(Continued)

FOREIGN PATENT DOCUMENTS

EP 0199264 9/1992
EP 2020827 2/2009
(Continued)

OTHER PUBLICATIONS

Translation of JP-2006207874-A (Year: 2006).*
(Continued)

*Primary Examiner* — Elizabeth M Kerr
(74) *Attorney, Agent, or Firm* — Fish & Richardson P.C.

(57) ABSTRACT

The present disclosure comprises a housing that defines a cavity therein, a door connected to the housing and configured to open and close the cavity, a microwave (MW) heating module configured to emit microwaves into the cavity, and an induction heating (IH) module configured to emit a magnetic field toward the cavity, the IH module comprises a shielding member through which the magnetic field generated by a working coil of the IH module passes and which blocks microwaves emitted from the MW heating module, and the shielding member comprises any one of carbon paper or carbon fabric woven with carbon fiber.

17 Claims, 9 Drawing Sheets

(56) References Cited

U.S. PATENT DOCUMENTS

| | | | | |
|---|---|---|---|---|
| 5,698,125 | A | 12/1997 | Kwon | |
| 2009/0008386 | A1 * | 1/2009 | Louie | H05B 6/6414 219/756 |
| 2010/0176123 | A1 * | 7/2010 | Mihara | H05B 6/705 219/746 |
| 2011/0031433 | A1 * | 2/2011 | Burchell | B29C 70/882 264/219 |
| 2013/0048370 | A1 * | 2/2013 | Tan | H05K 9/009 174/388 |
| 2015/0247289 | A1 * | 9/2015 | Kawaguchi | D21H 21/52 162/132 |
| 2021/0235555 | A1 * | 7/2021 | Lim | H05B 6/6411 |

FOREIGN PATENT DOCUMENTS

| | | | | | |
|---|---|---|---|---|---|
| JP | 2006207874 | A | * | 8/2006 | H05B 6/6488 |
| KR | 19960004901 | | | 2/1996 | |
| KR | 100176773 | | | 5/1999 | |
| KR | 1020180115981 | | | 10/2018 | |

OTHER PUBLICATIONS

PCT International Search Report & Written Opinion in International Appln. No. PCT/KR2021/000708, dated Jun. 8, 2021, 8 pages.

* cited by examiner

COOKING APPLIANCE

CROSS-REFERENCE TO RELATED APPLICATIONS

This application claims the benefit of Korean Patent Application No. 10-2020-0122564, filed on Sep. 22, 2020. The disclosures of the prior application are incorporated by reference in their entirety.

BACKGROUND

The present disclosure relates to a cooking appliance.

Various types of cooking appliances are used to heat food at home or in a restaurant. For example, various cooking appliances such as microwave ovens, induction heating type electric stoves, and grill heaters are used.

The microwave oven is a high-frequency heating type cooking appliance, uses a principle that molecules in the high-frequency electric field vibrate violently and thus generates heat, and can heat food evenly in a short time.

The induction heating type electric stove is a cooking appliance that heats an object to be heated using electromagnetic induction. Specifically, the induction heating type electric stove generates an eddy current in the object to be heated made of metal by using a magnetic field generated around the coil when a predetermined amount of high-frequency power is applied to the coil and thus can heat the object to be heated itself.

The grill heater is a cooking appliance that heats food by causing infrared heat to be radiated or convected, and since infrared heat penetrates the food, food can be cooked evenly throughout.

As described above, as cooking appliances using various types of heat sources have been released, the number and types of cooking appliances provided to users have increased, and thus there is a problem that these cooking appliances occupy a large volume in a living space. Accordingly, demands from users for a complex cooking appliance including a plurality of heating modules are increasing. In addition, there is a need to develop a cooking appliance using a plurality of heating methods simultaneously so that food in an object to be heated is cooked more uniformly and quickly.

Republic of Korea Patent Publication No. 10-2018-0115981 (published on Oct. 24, 2018) describes a cooking appliance that provides a microwave and an induction heating heat source in one appliance. However, the conventional cooking appliance is configured to cover the induction heating coil through a shielding cover when a microwave heat source is used, so that the two heat sources are not used simultaneously.

In addition, conventional cooking appliances have the inconvenience of rotating the shielding cover every time a microwave heat source is used, and there are limits that the structure thereof is complicated and the manufacturing cost thereof increases because a rotary motor for rotating the shielding cover or the like must be separately provided.

SUMMARY

An object of the present disclosure is to provide a complex cooking appliance having a plurality of heat sources.

An object of the present disclosure is to provide a cooking appliance including a microwave (MW) heating module and an induction heating (IH) module. More specifically, an object of the present disclosure is to provide a cooking appliance in which the MW heating module and the IH module can simultaneously heat an object to be heated.

An object of the present disclosure is to provide a cooking appliance capable of maximizing the efficiency of the IH module when the MW heating module and the IH module simultaneously heat an object to be heated.

A cooking appliance according to an embodiment of the present disclosure may comprise an MW heating module configured to emit microwaves into the cavity and an IH module configured to emit a magnetic field toward the cavity, the IH module may comprise a working coil and a shielding member, and the shielding member may comprise any one of carbon paper or carbon fabric woven with carbon fibers.

In addition, the thickness of the shielding member of the cooking appliance according to the embodiment of the present disclosure may be thicker than a skin depth caused by electromagnetic waves emitted from the MW heating module, and thinner than a skin depth caused by the electromagnetic waves emitted from the IH module so that the shielding member may block microwaves and pass an induced magnetic field.

According to the present disclosure, since the shielding member of the cooking appliance passes an induced magnetic field generated from a working coil and simultaneously blocks microwaves, there is an advantage that the MW heating module and the IH module can be simultaneously driven.

In addition, since the shielding member is composed of any one of carbon fabric or carbon paper, heating by the IH module is minimized, thereby minimizing a decrease in heating efficiency of the IH module.

In addition, since the shielding member is composed of any one of carbon fabric or carbon paper, it is possible to simplify the structure of a cooking appliance that can use the IH module and the MW heating module at the same time, and the manufacturing process thereof is simplified.

In addition to the above-described effects, specific effects of the present disclosure will be described together while describing specific details.

DETAILED DESCRIPTION OF THE EMBODIMENTS

Figure 1:
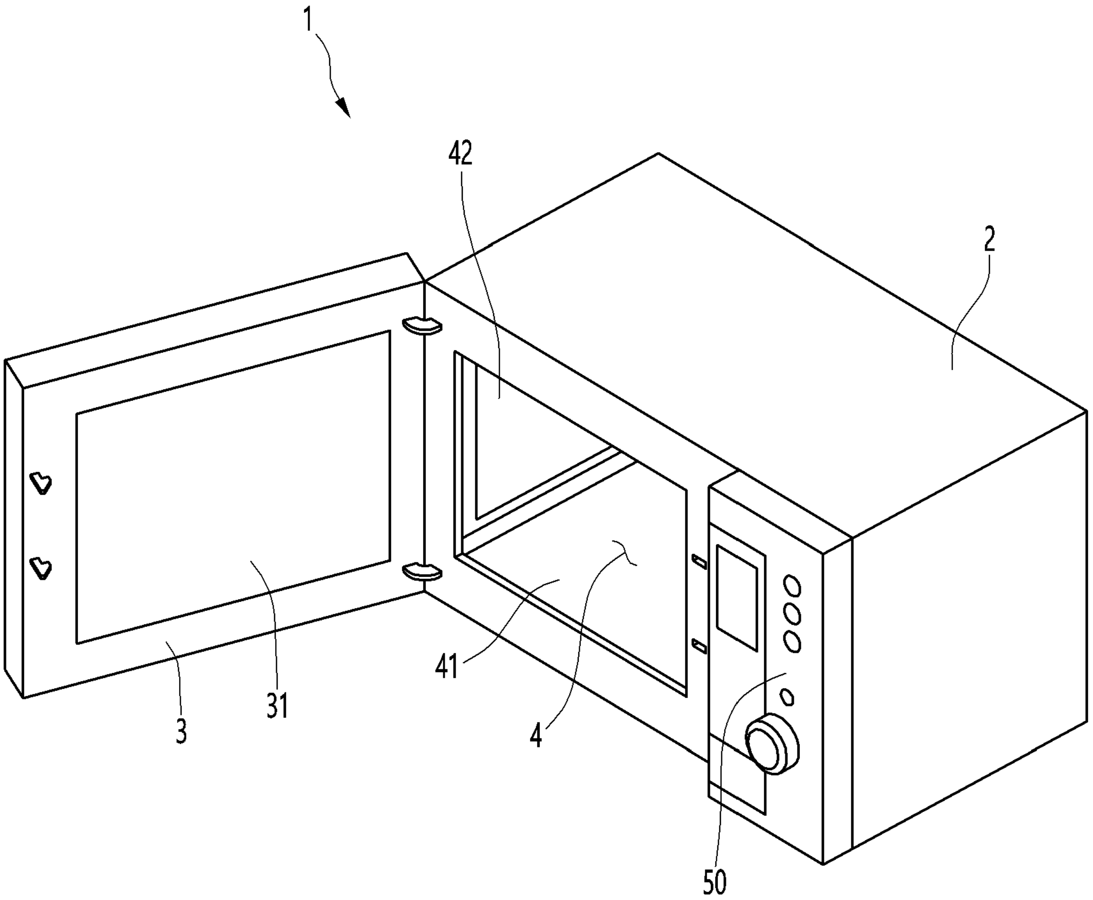
FIG. 1 is a perspective view illustrating a cooking appliance according to an embodiment of the present disclosure.

Hereinafter, embodiments according to the present disclosure will be described in detail with reference to the accompanying drawings. In the drawings, the same reference numerals are used to indicate the same or similar elements.

Hereinafter, a cooking appliance according to an embodiment of the present disclosure will be described.

FIG. 1 is a perspective view illustrating a cooking appliance according to an embodiment of the present disclosure.

The cooking appliance 1 according to the embodiment of the present disclosure may include a housing 2 and a door 3 connected to the housing 2.

The housing 2 may define a cavity 4 therein, and the cavity 4 may be a cooking chamber. The cavity 4 may be a cooking space in which an object to be heated is placed.

An input interface 50 may be formed on the outer surface of the housing 2. The input interface 50 may receive an input for manipulating the cooking appliance from a user.

The cavity 4 can be opened or closed by the door 3. The door 3 may be attached to the front portion of the housing 2 so as to be open and close. The door 3 can open and close the cavity 4. A window 31 may be formed on the door 3. The user can check the inside of the cavity 4 through the window 31 when the cavity 4 is closed. The window 31 will be described in detail in FIG. 9.

The cavity 4 may be formed as a first surface to a fifth surface and may be opened or closed depending on the position of the door 3. The first surface of the cavity 4 may be the bottom surface 41, the second surface may be the ceiling surface 43 (see FIG. 9), the third surface may be the rear surface 45 (see FIG. 9), and the fourth and fifth surfaces may be both side surfaces. Both side surfaces may be in contact with the bottom surface 41, the ceiling surface 43, and the rear surface 45, respectively. One 42 of both side surfaces may be formed close to the door 3 and the other (not illustrated) may be formed close to the input interface 50.

Figure 2:
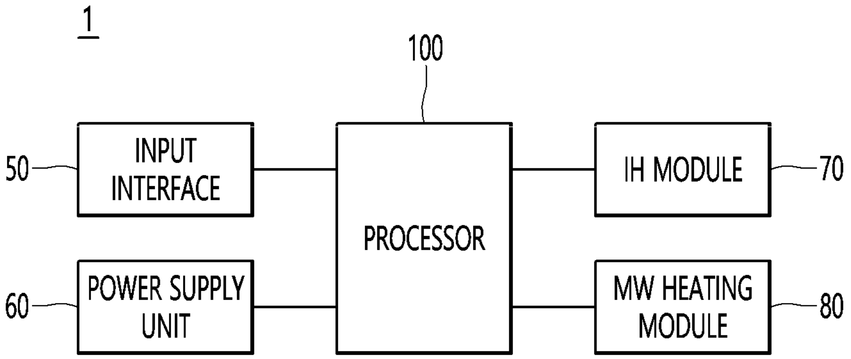
FIG. 2 is a control block diagram illustrating a cooking appliance according to an embodiment of the present disclosure.

FIG. 2 is a control block diagram illustrating a cooking appliance according to an embodiment of the present disclosure.

The cooking appliance 1 may include an input interface 50, a power supply unit 60, an IH module 70, an MW heating module 80, and a processor 100. Meanwhile, FIG. 2 is merely an example for convenience of description, and the cooking appliance 1 according to the embodiment of the present disclosure further includes other components other than the components illustrated in FIG. 2 or may omit some of the components illustrated in FIG. 2.

The processor 100 may control the overall operation of the cooking appliance 1. The processor 100 may control the input interface 50, the power supply unit 60, the IH module 70, and the MW heating module 80, respectively. The processor 100 may control the IH module 70 and the MW heating module 80 to operate the cooking appliance 1 according to an input received through the input interface 50.

The input interface 50 may receive various inputs capable of operating the cooking appliance 1. For example, the input interface 50 may receive an operation start input or an operation stop input of the cooking appliance 1. As another example, the input interface 50 may receive an input for driving the IH module 70 or an input for driving the MW heating module 80.

The power supply unit 60 may receive power required for the operation of the cooking appliance 1 from the outside. The power supply unit 60 may supply power to the input interface 50, the IH module 70, the MW heating module 80, the processor 100, or the like.

The IH module 70 may be an induction heating type heat source. The IH module 70 can emit a magnetic field towards the cavity 4. In this specification, the magnetic field emitted from the IH module 70 may mean a magnetic field emitted from the working coil of the IH module 70.

The IH module 70 may generate a magnetic field through a working coil, and when the object to be heated in the cavity 4 is a magnetic material, the IH module 70 may directly heat the object to be heated.

Specifically, the IH module 70 may include at least some or all of a working coil, a plate, a heat insulating material, a shielding member, and a ferrite. In addition, the IH module 70 may further include an inverter capable of driving the working coil, or the like.

The MW heating module 80 may provide microwaves into the cavity 4. The MW heating module 80 can emit microwaves into the cavity 4.

The MW heating module 80 may include a magnetron positioned outside the cavity 4 in the housing 2 to generate microwaves, and a waveguide for guiding microwaves generated from the magnetron to the cavity 4.

Meanwhile, in FIG. 2, the cooking appliance 1 is illustrated as having only the IH module 70 and the MW heating module 80, but according to the embodiment, the cooking appliance 1 may further include a grill heater module (not illustrated).

The grill heater module (not illustrated) may supply radiant heat to heat food contained in the cavity 4. The grill heater module (not illustrated) may include a heating unit (not illustrated) having an infrared heating wire and may cause infrared heat generated from the heating unit (not illustrated) to be radiated or convected to the cavity 4.

In other words, according to an embodiment of the present disclosure, the cooking appliance 1 may include an IH module 70, an MW heating module 80, and a grill heater module (not illustrated), and the IH module 70 emits a magnetic field toward the first surface of the cavity 4, the MW heating module 80 supplies microwaves to the cavity 4 through the second surface of the cavity 4, and a grill heater module (not illustrated) may supply radiant heat to the cavity 4 through the third surface of the cavity 4.

Hereinafter, a case where the cooking appliance 1 includes the IH module 70 and the MW heating module 80 will be described.

Meanwhile, when the IH module 70 and the MW heating module 80 of the cooking appliance 1 are operated at the same time, the working coil 140 of the IH module 70 may be damaged by microwaves generated from the MW heating module 80. In addition, when the working coil 140 (see FIG. 9) is heated by microwaves, there is a problem that accurate control of the IH module 70 is impossible.

Therefore, the cooking appliance 1 of the present disclosure may be provided with a shielding member 130 in the IH module 70 or between the IH module 70 and the MW heating module 80 to protect the elements inside the IH module 70.

Next, the shape and material configuration of the shielding member 130 provided in the cooking appliance 1 of the present disclosure will be described in more detail, with reference to FIGS. 3 to 7.

Figure 3:
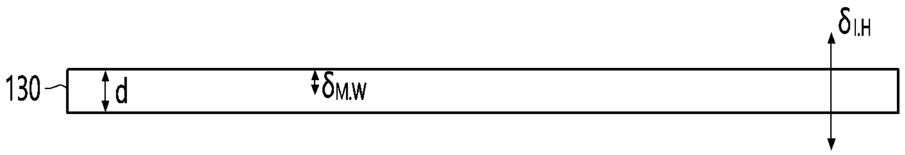
FIG. 3 is an exemplary view illustrating a shielding member provided in the cooking appliance of the present disclosure, viewed from the side.

FIG. 3 is an exemplary view illustrating a shielding member provided in the cooking appliance of the present disclosure, viewed from the side.

In FIG. 3, d denotes the thickness of the shielding member 130, $\delta_{M.W}$ denotes a skin depth by electromagnetic waves emitted from the MW heating module 80, and $\delta_{I.H}$ denotes a skin depth caused by electromagnetic waves emitted from the IH module 70.

The shielding member 130 may be made of a conductor.

When an alternating current flows through a conductor, a skin effect occurs in the conductor. The skin effect means a phenomenon in which the current is concentrated on the surface of the conductor as the frequency of the current flowing through the conductor increases. In this case, the depth from the surface of the conductor to the region through which the current flows may be defined as a skin depth δ.

The skin depth becomes thinner as the frequency of the current flowing through the conductor increases and becomes thicker as the frequency of the current decreases. In addition, when the skin depth caused by a specific electromagnetic wave is thinner than the thickness of the conductor, the electromagnetic wave cannot pass through the conductor. Conversely, when the skin depth caused by a specific electromagnetic wave is thicker than the thickness of the conductor, the electromagnetic wave may pass through the conductor.

In general, the frequency of the electromagnetic wave (microwave) emitted from the MW heating module 80 is in GHz (Gigahertz, $10^9$ Hz), and the frequency of the electromagnetic wave emitted from the IH module 70 is in KHz (kilohertz, $10^3$ Hz) unit. For example, the frequency of the microwave may be 2.4 to 2.5 GHz, and the frequency of the electromagnetic wave emitted from the IH module 70 may be 35 to 60 KHz, but this is only an example.

The thickness d of the shielding member 130 according to the embodiment of the present disclosure is thicker than the skin depth $\delta_{M.W}$ by microwave and may be thinner than the skin depth $\delta_{I.H}$ by electromagnetic waves emitted from the IH module 70. The thickness d of the shielding member 130 of the present disclosure may be thicker than a value obtained by multiplying the skin depth $\delta_{M.W}$ by the microwave by a predetermined constant (for example, 4) to block microwaves more effectively and may be thinner than the skin depth $\delta_{I.H}$ caused by the electromagnetic wave emitted from the IH module 70.

Accordingly, the shielding member 130 of the present disclosure may cause microwaves generated from the MW heating module 80 to be shielded and the induced magnetic field emitted from the IH module 70 to be passed.

Next, the material properties of the shielding member 130 of the present disclosure will be described in detail. The shielding member 130 of the present disclosure may be made of any one of carbon fabric, carbon paper, carbon felt, graphite, and graphene.

When the shielding member 130 is made of any one of carbon fabric, carbon paper, carbon felt, graphite, and graphene, the shielding member 130 may exhibit excellent microwave shielding effectiveness caused by high electrical conductivity. In addition, since the shielding member 130 causes the heating by the IH module 70 to be minimized, the heating performance of the IH module 70 can be maximized.

In addition, when the shielding member 130 is made of any one of carbon fabric, carbon paper, carbon felt, graphite, and graphene, heat heated by microwaves may be easily released due to high thermal conductivity. In addition, since the shielding member 130 of the present disclosure does not have to go through a separate processing process for creating a pattern, there is an advantage of simplifying the manufacturing process.

In general, the carbon fabric may mean to include a carbon fabric manufactured by weaving carbon fibers, carbon felt, carbon paper, or the like, but in the present specification, the carbon fabric means only a carbon fabric manufactured by weaving carbon fibers and carbon felt and carbon paper are used in a different sense from the carbon fabric.

The carbon fabric of the present disclosure may mean a carbon fabric manufactured by weaving carbon fibers by a method such as plain, twill, satin, or the like.

First, with reference to FIGS. 4 to 6, an advantage will be described when the shielding member 130 of the present disclosure is made of a carbon fabric manufactured by weaving carbon fibers among the above-described configurations.

Figure 4:
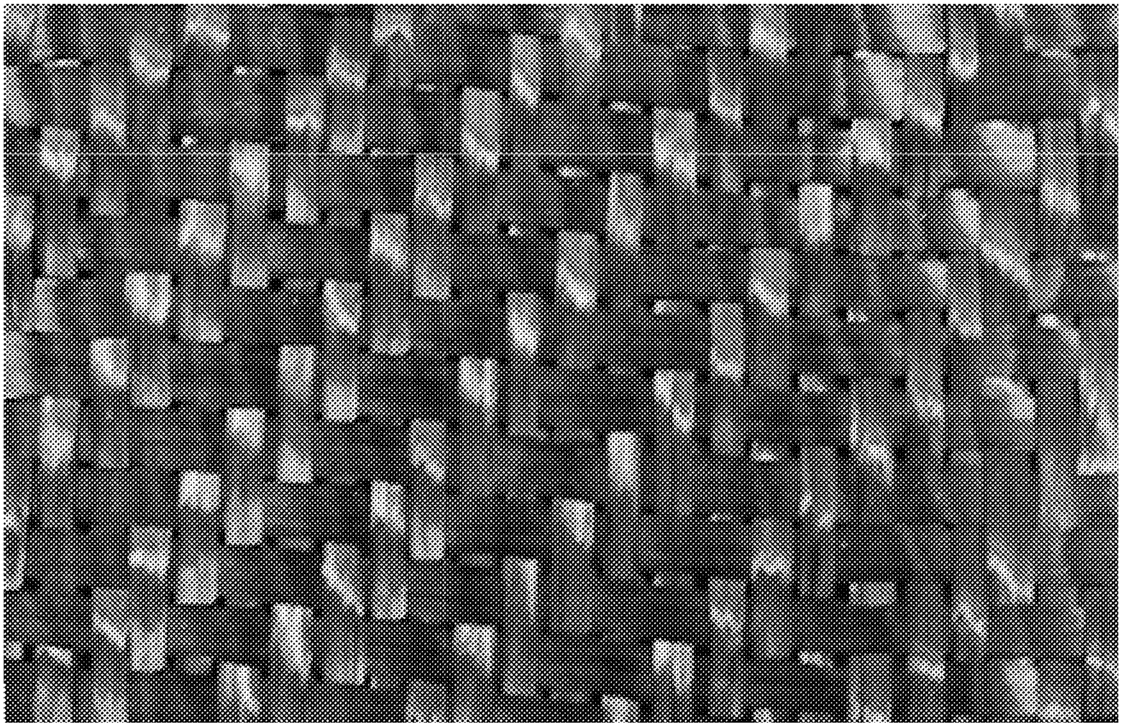
FIGS. 4 and 5 are views illustrating the surface of the shielding member when the shielding member of the present disclosure is made of carbon fabric as a single material.
Figure 5:
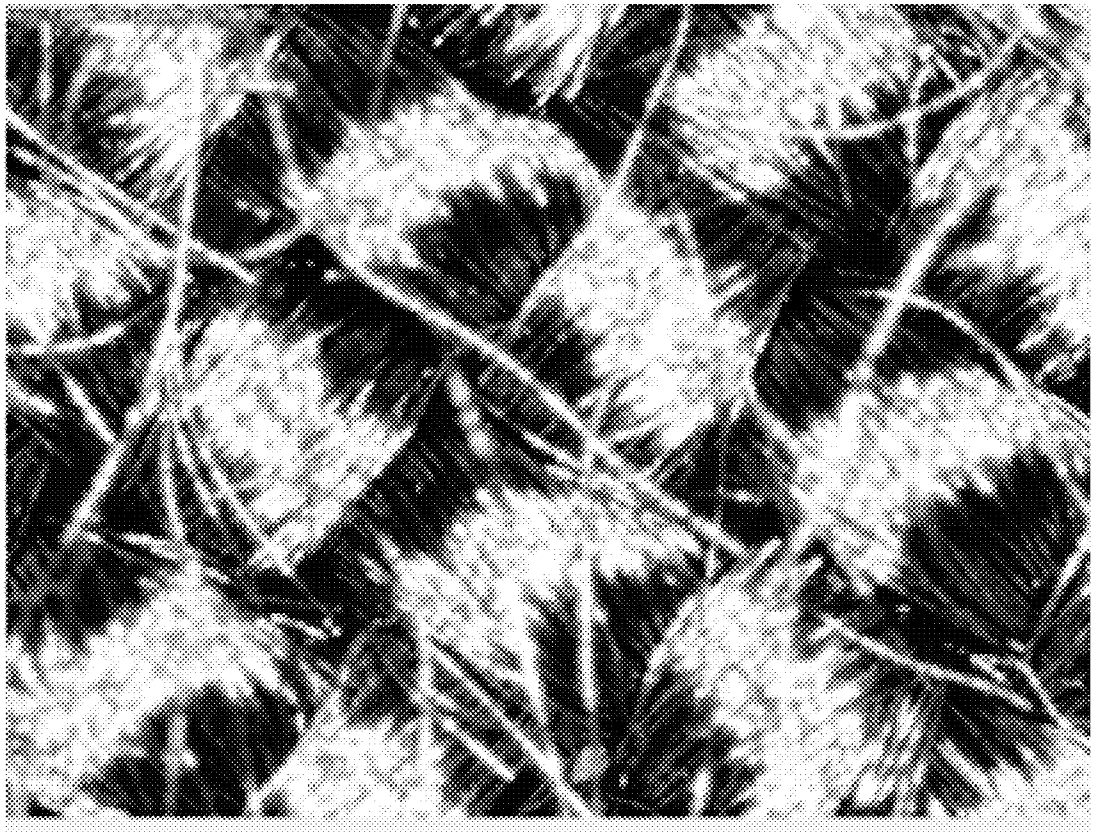

FIGS. 4 and 5 are views illustrating the surface of the shielding member when the shielding member of the present disclosure is made of carbon fabric as a single material.

The shielding member 130 of the present disclosure may be a carbon fabric woven by crossing the carbon fibers in the vertical direction and the horizontal direction as illustrated in FIG. 4.

When the shielding member 130 of the present disclosure is made of a carbon fabric woven by crossing carbon fibers in the vertical direction and the horizontal direction, there is the effect of shielding the horizontal and vertical components of microwaves emitted from the MW heating module 80. For example, carbon fibers arranged in the horizontal direction (0°) may shield microwaves incident in the vertical direction (90°), on the carbon fibers arranged in the horizontal direction, and carbon fibers arranged in the vertical direction (90°) may shield microwaves incident in the horizontal direction (0°), on the carbon fibers arranged in the vertical direction. This shielding effect may be an additional shielding effect acting together with the microwave shielding effect caused by the above-described skin effect.

Therefore, when the shielding member 130 of the present disclosure is made of a carbon fabric woven by crossing carbon fibers, there is an advantage of additionally shielding the vertical component and the horizontal component of the microwave.

Meanwhile, when the shielding member 130 is made of a carbon fabric woven by crossing carbon fibers as a single material, the carbon yarn dropping phenomenon may occur as illustrated in FIG. 5.

The carbon yarn dropping phenomenon means a phenomenon that the ends of the carbon fibers come out during a manufacturing process of manufacturing a carbon fabric by weaving carbon fibers or a process of processing the carbon fabric into the shielding member 130 of the present disclosure. When the material in which the yarn dropping phenomenon occurs is used as the shielding member 130 of the present disclosure, a spark may be generated by microwaves emitted from the MW heating module 80.

Accordingly, the shielding member 130 of the cooking appliance 1 of the present disclosure may be made of a carbon fabric material having a surface processed.

Figure 6:
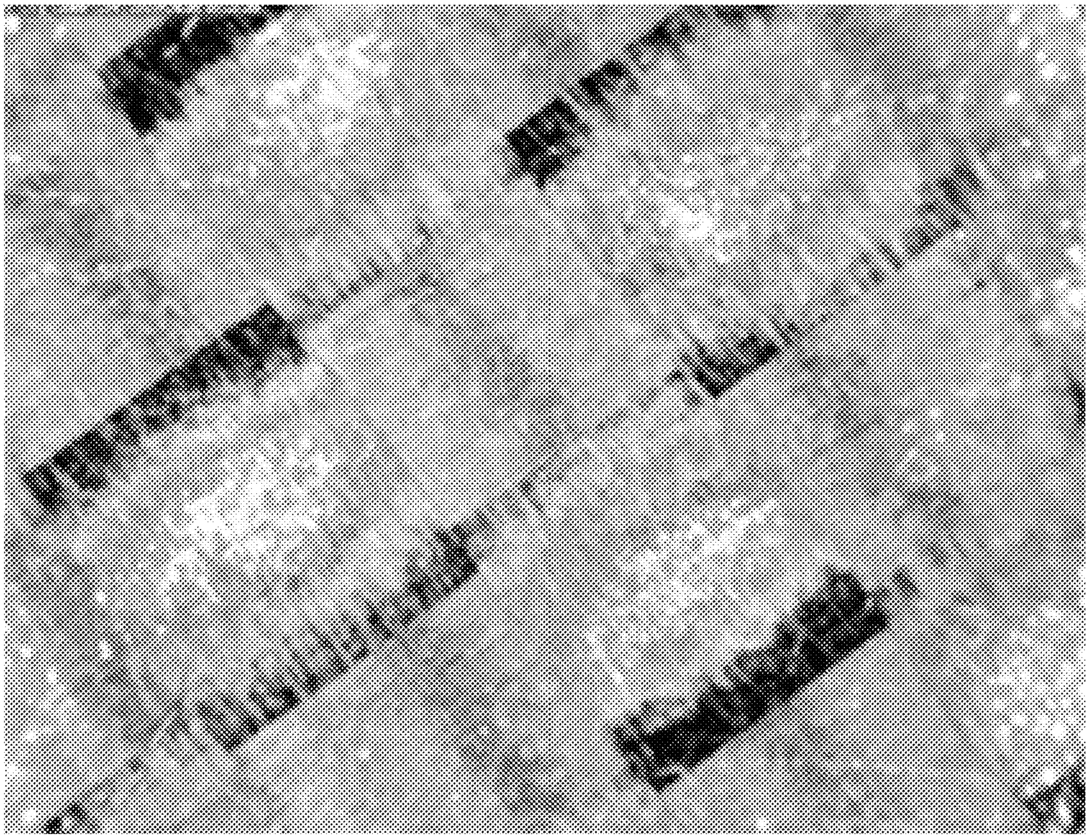
FIG. 6 is a view illustrating the surface of the shielding member when the shielding member of the present disclosure is made of carbon fabric whose surface has been processed.

FIG. 6 is a view illustrating the surface of the shielding member when the shielding member of the present disclosure is made of carbon fabric whose surface has been processed.

The shielding member 130 of the present disclosure may be made of a carbon fabric whose surface is processed as illustrated in FIG. 6. A phenolic coating agent having a high heat-resistant temperature may be used in the surface processing of the carbon fabric, and a siloxane-based coating agent as an inorganic coating agent may be used thereto. Since the surface processing method is a known technique, a detailed description thereof will be omitted.

Referring to FIG. 6, it can be seen that the shielding member 130 has been processed smoothly without the yarn coming out of the surface of the shielding member.

When a carbon fabric whose surface has been processed is used as the shielding member 130 of the present disclosure, there is an advantage that the problem of generating sparks caused by microwaves can be solved as well as the heat resistance of the shielding member 130 which are simultaneously heated by the MW heating module 80 and the IH module 70 can be secured.

Next, an advantage will be described with reference to FIG. 7 when the shielding member 130 of the present disclosure is made of carbon paper among the configurations described above.

Figure 7:
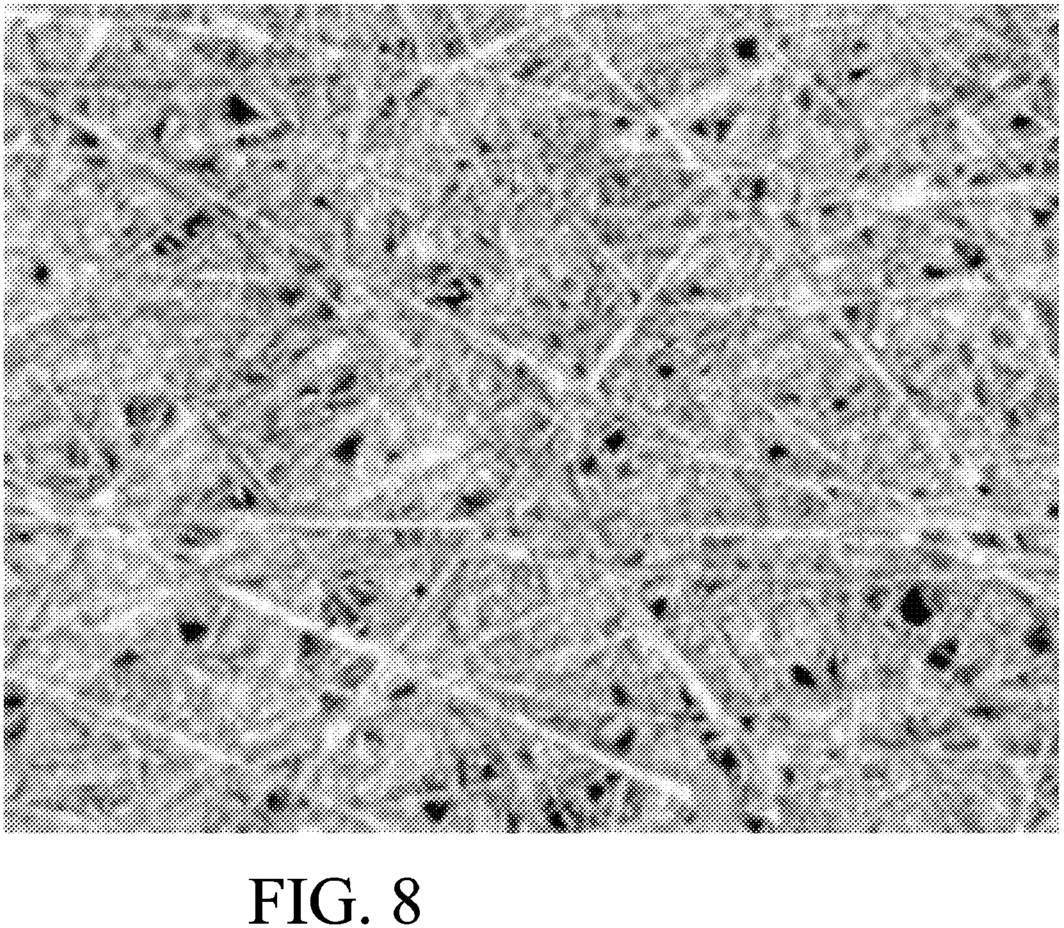
FIG. 7 is a view illustrating the surface of the shielding member when the shielding member of the present disclosure is made of carbon paper.

FIG. 7 is a view illustrating the surface of the shielding member when the shielding member of the present disclosure is made of carbon paper.

Carbon paper may mean a material made by randomly orienting carbon fibers in a two-dimensional plane. Accordingly, when the shielding member 130 of the present disclosure is made of carbon paper, the surface of the shielding member 130 may be the same as that illustrated in FIG. 7.

When the shielding member 130 is made of carbon paper and has a surface as illustrated in FIG. 7, since carbon fibers are randomly disposed, there is an effect of shielding all components from the horizontal component (0°) to the vertical component (90°) of the microwave emitted from the MW heating module 80.

In addition, carbon paper can obtain the shielding effect of the microwave even with a thin thickness compared to other materials composed of carbon fibers.

Table 1 below shows the performance of the MW heating module 80 and the efficiency of the IH module 70 according to the thickness of the shielding member 130 for each material when the shielding member 130 is made of carbon paper, carbon fabric, and carbon felt.

TABLE 1

| | Thickness (mm) | M.W Performance (mW/cm$^2$) | I.H Performance Rs (45 khz) | IH Efficiency (%) |
|---|---|---|---|---|
| Carbon paper | 0.2 | Less than 0.45 | 122 | 78.3 |
| | 0.3 | Less than 0.34 | 166 | 77.9 |
| Carbon felt | 5 | Less than 0.28 | 428.5 | 73.7 |
| | 8 | Less than 0.12 | 499.7 | 70.5 |
| carbon fabric | 3 | Less than 0.66 | 458.5 | 73.5 |

In the table above, M.W performance (mw/cm$^2$) means microwave transmitted per square centimeter, and in general, when M.W performance (mw/cm$^2$) is 3 (mw/cm$^2$) or less, it is considered to have a microwave shielding effect. In addition, Rs(45 khz) means the equivalent resistance of the shielding member 130 when the frequency of the IH module 70 is 45 khz, and the lower the equivalent resistance, the better the IH efficiency.

In this way, when carbon paper is used as the shielding member 130, it is possible to achieve high IH efficiency with a thin thickness compared to other materials. In particular, when the shielding member 130 is made of carbon paper, the thickness of the shielding member 130 may be 1 mm or less.

Therefore, when carbon paper is used as the shielding member 130 of the present disclosure, there is an advantage of reducing the volume of the product.

Next, a disposition structure of the shielding member 130, the IH module 70, and the MW heating module 80 in the cooking appliance 1 of the present disclosure will be described.

Figure 8:
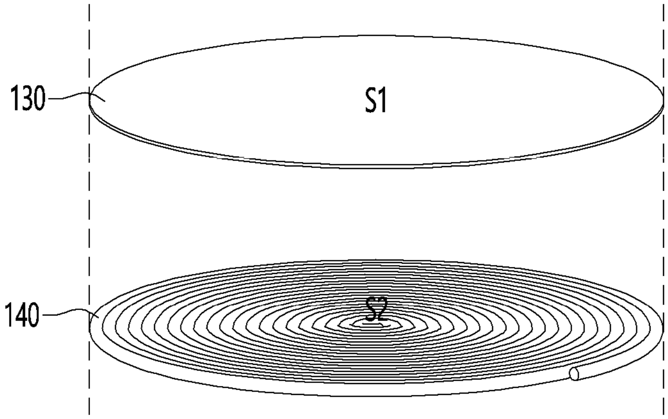
FIG. 8 is a perspective view illustrating a shielding member and a working coil provided in the cooking appliance of the present disclosure.

FIG. 8 is a perspective view illustrating a shielding member and a working coil provided in the cooking appliance of the present disclosure.

Referring to FIG. 8, the shielding member 130 may be disposed to vertically overlap the working coil 140. The size of the shielding member 130 may be greater than or equal to the size of the working coil 140.

In this specification, the shapes of the shielding member 130 and the working coil 140 are illustrated in a circular shape, but each of the shielding member 130 and the working coil 140 may have various shapes, and the scope of the present disclosure is not limited thereto.

The cross-sectional area S1 of the shielding member 130 in the horizontal direction may be equal to the cross-sectional area S2 of the working coil 140 in the horizontal direction or larger than the cross-sectional area S2 of the working coil 140 in the horizontal direction.

If the cross-sectional area S1 of the shielding member 130 in the horizontal direction is equal to the cross-sectional area S2 of the working coil 140 in the horizontal direction or larger than the cross-sectional area S2 of the working coil 140 in the horizontal direction, there is an advantage that the working coil 140 can be effectively shielded from microwaves.

In other words, if the cross-sectional area S1 of the shielding member 130 in the horizontal direction is equal to or larger than the cross-sectional area S2 of the working coil 140 in the horizontal direction, the shielding effect can be obtained, and thus the shielding effect can be obtained even if the shielding member 130 is not placed on the entire upper surface or the entire lower surface of the plate 110.

Figure 9:
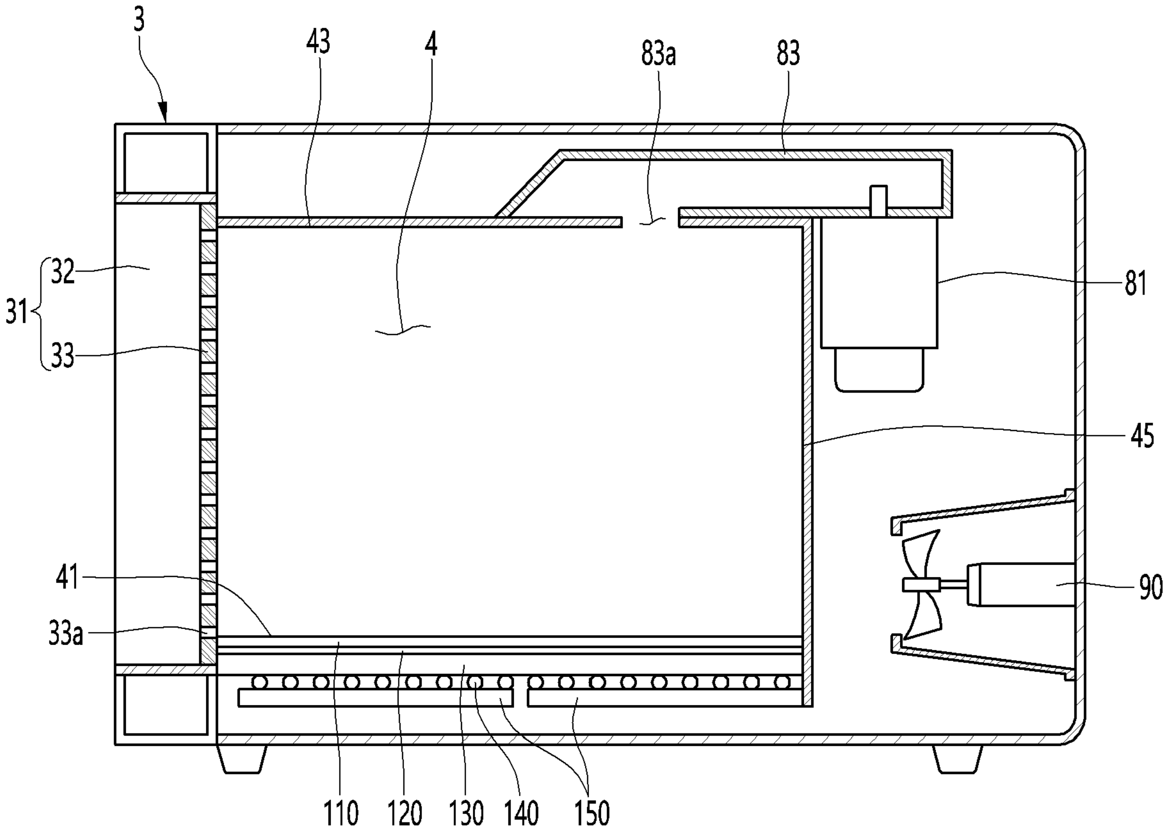
FIG. 9 is a cross-sectional view illustrating the cooking appliance according to a first embodiment of the present disclosure.

FIG. 9 is a cross-sectional view illustrating the cooking appliance according to a first embodiment of the present disclosure.

The door 3 can open and close the cavity 4. A window 31 may be formed on the door 3, and the window 31 may include a window unit 32 and a shielding unit 33.

The window unit 32 may be made of a transparent material or a translucent material. The user can see the inside of the cavity 4 through the window unit 32. The outer surface of the window unit 32 may face the outside of the cooking appliance 1, and the inner surface of the window unit 32 may face the inside of the cooking appliance 1.

The shielding unit 33 may be mounted on the inner surface of the window unit 32. The shielding unit 33 may block microwaves in the cavity 4 from moving to the outside of the cooking appliance 1 through the door 3.

The shielding unit 33 may be an iron net. A plurality of shielding holes 33*a* may be formed in the shielding unit 33, and the shielding hole 33*a* may have a size larger than a wavelength of visible light and smaller than a wavelength of a microwave. Accordingly, the user can see the inside of the cavity 4 through the shielding hole 33*a*, and microwaves cannot pass through the shielding hole 33*a*.

The housing 2 may be provided with a plate 110 forming a first surface (for example, the bottom surface 41) of the cavity 4.

The IH module 70 may include a plate 110 forming the first surface of the cavity 4, a heat insulating material 120 disposed under the plate 110, a shielding member 130, a working coil generating a magnetic field 140, and ferrite 150. The IH module 70 may emit a magnetic field toward the first surface of the cavity 4.

According to the first embodiment, the shielding member 130 may be disposed on the entire upper surface of the plate 110 or the entire lower surface of the plate 110. The shielding member 130 may be disposed between the heat insulating material 120 and the working coil 140. In FIG. 5, it is assumed that the shielding member 130 is entirely disposed between the heat insulating material 120 and the working coil 140, but this is only an example for convenience of description, and thus the present invention is not limited thereto.

In this case, the plate 110 may be formed of a non-magnetic material so that the magnetic field passes. The plate 110 may be made of a glass material (for example, ceramic glass). In other words, according to the first embodiment, the plate 110 may form the first surface 41 of the cavity 4 and cover the heat insulating material 120 and the shielding member 130 at the same time.

In addition, the size of the cross-sectional area of the shielding member 130 in the horizontal direction may be the same as the size of the cross-sectional area of the plate 110 in the horizontal direction. Accordingly, the movement of microwaves through the first surface of the cavity 4 may be blocked by the shielding member 130.

The ferrite 150 may be disposed under the working coil 140. The ferrite 150 may be mounted under the working coil 140 to block a magnetic field generated downward when the working coil 140 is driven.

The working coil 140 generates a magnetic field when driven, and when an object to be heated made of a magnetic material is placed in the cavity 4, the magnetic field passes through the shielding member 130 to induce an eddy current in the object to be heated so that the object to be heated can be heated.

In summary, the IH module 70 of the cooking appliance 1 according to the embodiment of the present disclosure may heat a magnetic material and may heat a corresponding object to be heated regardless of the position to place the object to be heated. Accordingly, the user may place the object to be heated on an arbitrary heating region on the cavity 4, so that the convenience of use may be improved.

Meanwhile, in the cooking appliance 1 according to the embodiment of the present disclosure, the MW heating module 80 as well as the IH module 70 may heat the object to be heated placed on the cavity 4.

The MW heating module 80 may be installed close to any one of the second to fifth surfaces of the cavity 4. For example, the MW heating module 80 may supply microwaves to the cavity 4 through the second surface of the cavity 4, and in this case, the second surface may be the ceiling surface 43, but this is only an example. In other words, the second surface may be at least one of the remaining surfaces other than the surface from which the magnetic field is emitted by the IH module 70. Hereinafter, it is assumed that the second surface is the ceiling surface 43.

The MW heating module 80 includes a magnetron 81, a waveguide 83, and a cooling fan 90, and the waveguide 83 has one side connected to the magnetron 81 and the other side connected to the cavity 4. At least one slot 83*a* through which microwaves pass may be formed on the ceiling surface 43 of the cavity 4. The cooling fan 90 may be installed around the magnetron 81 so that the magnetron 81 is cooled.

The object to be heated and food placed in the cavity 4 may be heated by the IH module 70 and the MW heating module 80.

In particular, according to the present disclosure, there is an advantage in that the heating time can be shortened because food can be simultaneously heated by the IH module 70 and the MW heating module 80 regardless of the position of the object to be heated.

Figure 10:
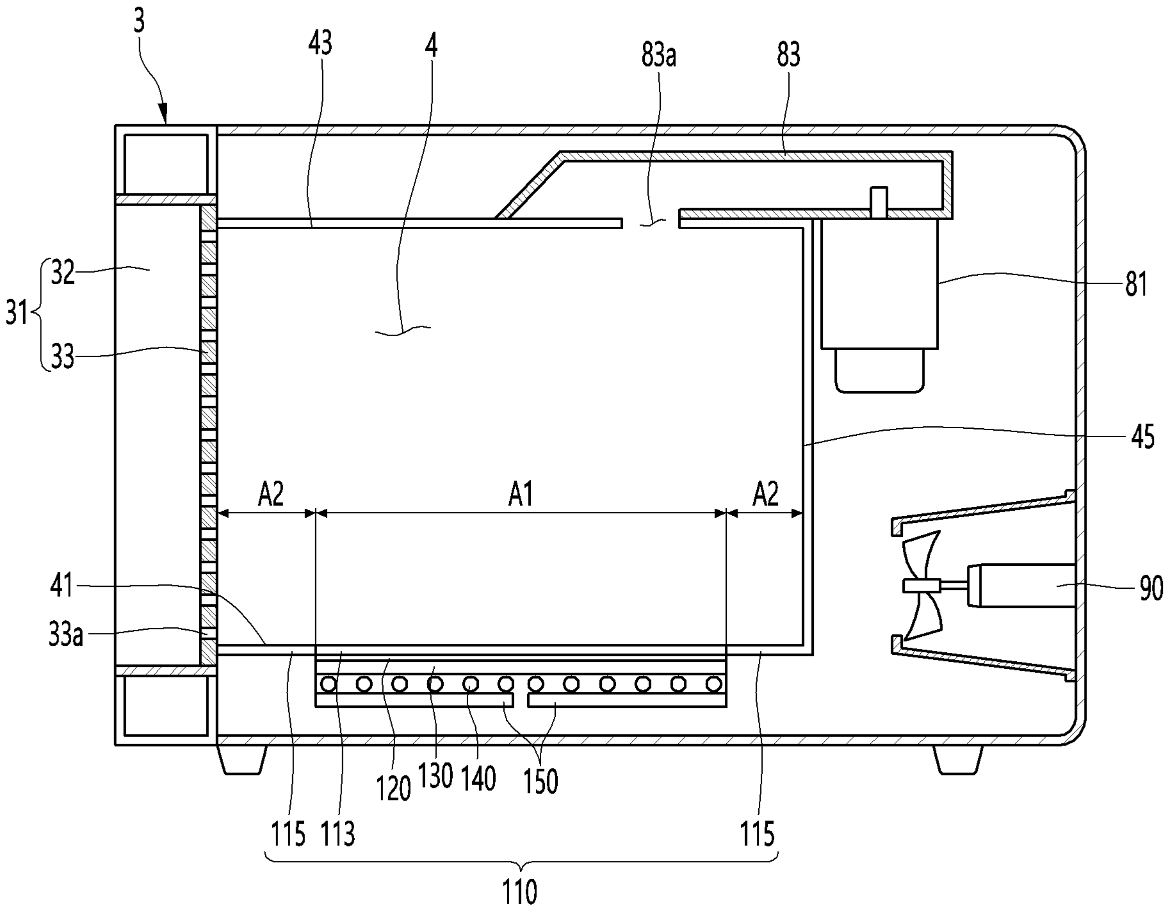
FIG. 10 is a cross-sectional view illustrating a cooking appliance according to a second embodiment of the present disclosure.

FIG. 10 is a cross-sectional view illustrating a cooking appliance according to a second embodiment of the present disclosure.

Since the features of the door 3, the shielding member 130, the MW heating module 80, and the like, excluding the structure, shape, or the like of the first surface 41 of the cavity 4 and the IH module 70 are the same as those described through the first embodiment, a duplicate description will be omitted. In other words, since the method for heating the object to be heated by the magnetic field generated from the working coil 140 is the same as that described in the first embodiment, a duplicate description will be omitted.

Referring to FIG. 10, a first surface (for example, a bottom surface 41) of the cavity 4 is formed in the housing 2, and at least a portion of the plate 110 may overlap the shielding member 130 in the vertical direction.

The plate 110 may be formed of a first plate 113 made of glass material and a second plate 115 made of iron material overlapping the shielding member 130 in the vertical direction. The working coil 140 of the IH module 70 may emit a magnetic field toward the first surface 41 of the cavity 4.

The first plate 113 may be disposed inside the second plate 115. The region A1 in which the first plate 113 is formed may be a heating region, and the region A2 in which the second plate 115 is formed may be a non-heating region.

The size of the cross-sectional area of the shielding member 130 in the horizontal direction may be less than or equal to the size of the cross-sectional area of the first plate 113 in the horizontal direction.

The size of the cross-sectional area of the shielding member 130 in the horizontal direction may be greater than or equal to the size of the cross-sectional area of the working coil 140 in the horizontal direction.

The first plate 113 may be made of components of the non-magnetic material so that the magnetic field passes. The first plate 113 may be made of the glass material (for example, ceramic glass). The first plate 113 may be made of a component having heat resistance to heat of an object to be heated, the heat of the shielding member 130, and the like. The first plate 113 may dissipate the heat of the shielding member 130.

The second plate 115 may be made of the components of the magnetic material. The second plate 115 may be made of iron material. The second plate 115 made of the components of the magnetic material may block microwaves from reaching the working coil 140.

According to the second embodiment, the cooking appliance 1 of the present disclosure does not entirely dispose the shielding member 130 on the first surface (for example, the bottom surface 41) of the cavity 4, but by disposing only under the first plate 113 which is the non-magnetic material, it is possible to minimize the damage problem of the IH module 70 caused by microwaves using a minimum amount of material.

Next, a configuration of a cooking appliance according to a third embodiment of the present disclosure will be described with reference to FIGS. 11 and 12.

Figure 11:
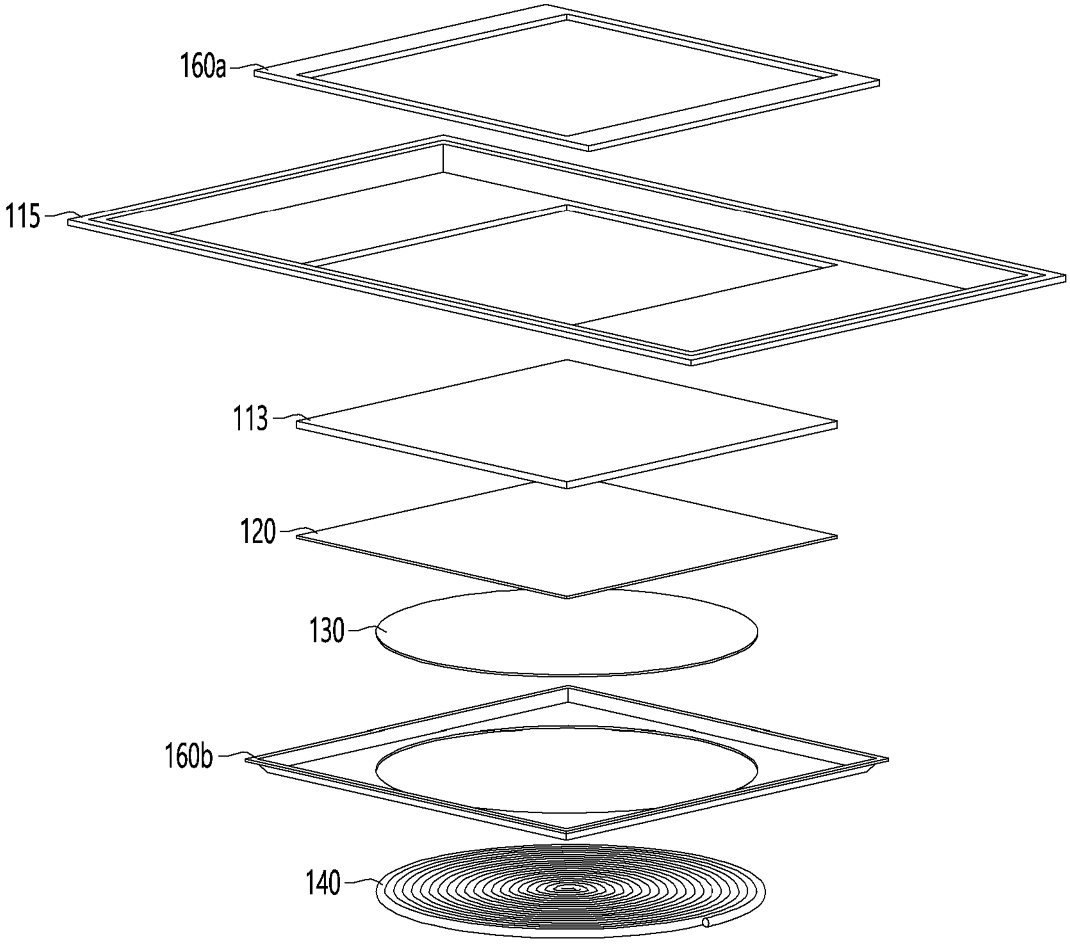
FIG. 11 is an exploded perspective view illustrating an IH module according to a third embodiment of the present disclosure.

FIG. 11 is an exploded perspective view illustrating an IH module according to a third embodiment of the present disclosure.

Figure 12:
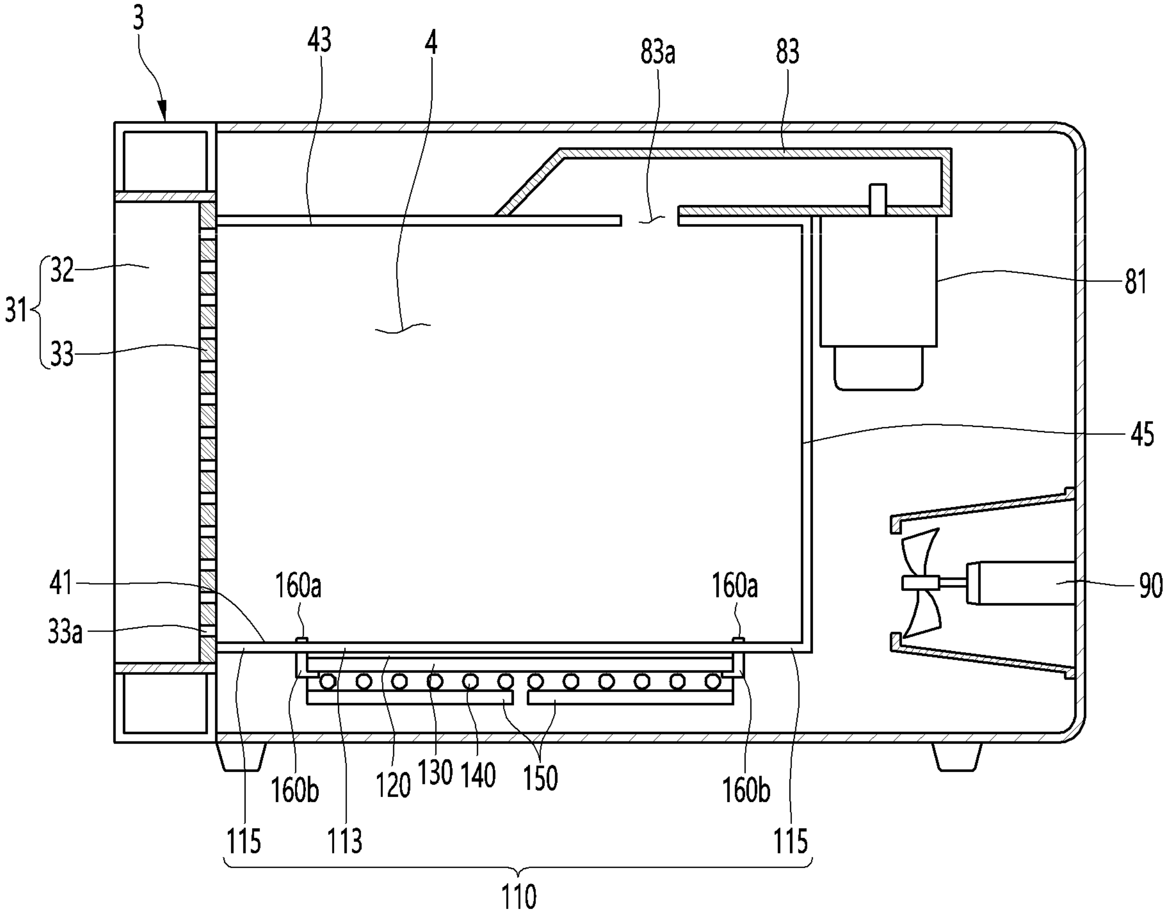
FIG. 12 is a cross-sectional view illustrating a cooking appliance according to a third embodiment of the present disclosure.

FIG. 12 is a cross-sectional view illustrating a cooking appliance according to a third embodiment of the present disclosure.

According to the third embodiment, the IH module 70 of the present disclosure may further include connection members 160*a* and 160*b* for fixing the shielding member 130 or the like.

The IH module 70 may include a working coil 140, a heat insulating material 120, a first plate 113 made of glass material, and a second plate 115 made of iron material. According to the third embodiment, as illustrated in FIG. 11, the IH module 70 of the present disclosure may further include connection members 160*a* and 160*b* for fixing the shielding member 130 in the IH module 70. The connection members 160*a* and 160*b* may be holders or brackets, but this is only an example.

A heat insulating material 120 may be disposed under the first plate 113, and a shielding member 130 may be disposed under the heat insulating material 120. Unlike illustrated in the drawing, the shielding member 130 may be disposed under the first plate 113, and the heat insulating material 120 may be disposed under the shielding member 130.

The first connection member 160*a* is disposed above the first plate 113 and the second plate 115, the second connection member 160*b* is disposed under the first plate 113 and the second plate 115, and the first plate 113, the second plate 115, the heat insulating material 120, and the shielding member 130 may be disposed between the first connection member 160*a* and the second connection member 160*b*.

Therefore, the first connection member 160*a* and the second connection member 160*b* can serve to fix the first plate 113, the second plate 115, the heat insulating material 120, and the shielding member 130. In addition, the first connection member 160*a* and the second connection member 160*b* may serve to partition the heating region and the non-heating region.

Referring to the cross-sectional view of FIG. 12, the first connection member 160*a* may be disposed on the plate 110, and the second connection member 160*b* may be disposed under the plate 110, as a shape of surrounding the heat insulating material 120 and the shielding member 130. Therefore, when the shielding member 130 is disposed on the upper surface or the lower surface of the plate 110 since a separate bonding process or coating process is not required and only the end of the shielding member 130 can be fixed to obtain a fixing effect, there is an advantage that the manufacturing process thereof can be simplified. In addition, the heating region by the IH module 70 can be clearly displayed to the user by partitioning the heating region and the non-heating region caused by the protrusion of the first connection member 160*a* into the cavity 4.

The above description is merely to describe the technical idea of the present disclosure by way of example, and a person skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments.

The scope of protection of the present disclosure should be interpreted by the following claims, and all technical ideas within the scope equivalent thereto should be construed as being included in the scope of the present disclosure.

EXPLANATION OF REFERENCE NUMERAL

| | |
|---|---|
| 1: cooking appliance | 2: housing |
| 3: door | 4: cavity |
| 70: IH module | 80: MW heating module |
| 110: plate | 120: heat insulating material |
| 130: shielding member | 140: working coil |
| 150: ferrite | |

What is claimed is:

1. A cooking appliance comprising:

a housing that defines a cavity therein;

a door connected to the housing and configured to open and close the cavity;

a microwave (MW) heating module configured to emit microwaves into the cavity; and an induction heating (IH) module configured to emit a magnetic field toward the cavity, wherein the IH module comprises a shielding member through which the magnetic field generated by a working coil of the IH module passes, the shielding member being configured to block the microwaves emitted from the MW heating module, wherein the shielding member comprises any one of carbon paper or carbon fabric woven with carbon fiber, wherein the IH module further comprises a plate and a plurality of connection members, the plurality of connection members being positioned on vertically opposite sides of both the plate and the shielding member, and wherein the plurality of connection members comprise:

a first connection member that passes through the plate and that protrudes into the cavity, the first connection member partitioning the plate into a heating region and a non-heating region, and a second connection member that is positioned between the shielding member and the working coil and that fixes the shielding member to the plate together with the first connection member.

2. The cooking appliance of claim 1, wherein the carbon fabric woven with the carbon fiber is a fabric woven by crossing carbon fibers in a vertical direction and a horizontal direction.

3. The cooking appliance of claim 1, wherein a thickness of the carbon paper is 1 mm or less.

4. The cooking appliance of claim 1, wherein a thickness of the shielding member is greater than a skin depth caused by electromagnetic waves emitted from the MW heating module, and less than a skin depth caused by electromagnetic waves emitted from the working coil of the IH module.

5. The cooking appliance of claim 1, wherein a thickness of the shielding member is greater than a value obtained by multiplying a predetermined constant by a skin depth caused by electromagnetic waves emitted from the MW heating module and less than a skin depth caused by electromagnetic waves emitted from the IH module.

6. The cooking appliance of claim 1, wherein the IH module comprises: the plate forming a first surface of the cavity, a heat insulating material disposed under the plate, and the working coil configured to generate the magnetic field, and wherein the shielding member is disposed between the heat insulating material and the working coil.

7. The cooking appliance of claim 6, wherein a size of a cross-sectional area of the shielding member in a horizontal direction is greater than or equal to a size of a cross-sectional area of the working coil in the horizontal direction.

8. The cooking appliance of claim 6, wherein the shielding member overlaps at least a portion of the working coil in a vertical direction.

9. The cooking appliance of claim 6, wherein the housing is provided with the plate that forms the first surface of the cavity and overlaps at least a portion of the working coil in a vertical direction.

10. The cooking appliance of claim 9, wherein the plate is formed of a first plate made of glass and a second plate made of iron.

11. The cooking appliance of claim 10, wherein the first plate is disposed inside the second plate.

12. The cooking appliance of claim 11, wherein the working coil overlaps at least a portion of the first plate in the vertical direction.

13. The cooking appliance of claim 1, wherein the IH module is configured to emit the magnetic field toward a first surface of the cavity, and wherein the MW heating module is configured to supply the microwaves to the cavity through a second surface of the cavity.

14. The cooking appliance of claim 13, wherein the first surface of the cavity is a bottom surface of the cavity, and wherein the second surface of the cavity is at least one of other surfaces other than the bottom surface of the cavity.

15. The cooking appliance of claim 1, wherein the second connection member is in contact with the shielding member.

16. The cooking appliance of claim 1, wherein the second connection member is in contact with a lateral side of the shielding member.

17. The cooking appliance of claim 1, wherein the second connection member is in contact with a lower side of the shielding member.

* * * * *